F. G. WILSON.
NAIL EXTRACTOR.
APPLICATION FILED JUNE 20, 1912.
1,114,837.
Patented Oct. 27, 1914.
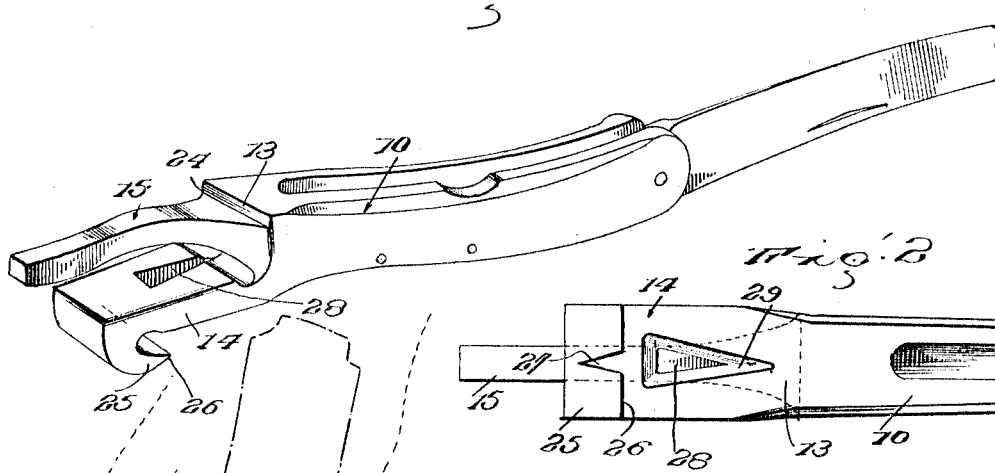
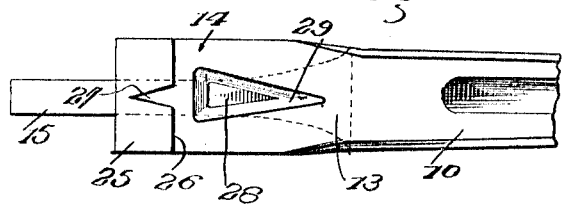
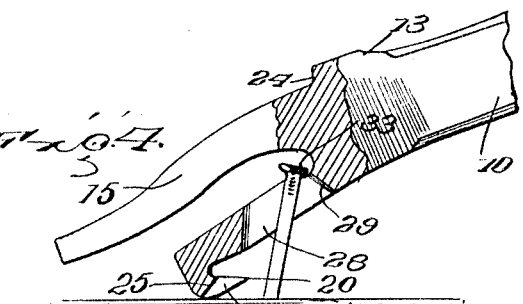
Inventor
F. G. Wilson

UNITED STATES PATENT OFFICE.

FRANK G. WILSON, OF CRAWFORDSVILLE, ARKANSAS, ASSIGNOR TO CHARLES C. BIRD, OF MARION, ARKANSAS.

NAIL-EXTRACTOR.

1,114,837.  Specification of Letters Patent.  Patented Oct. 27, 1914.

Application filed June 20, 1912. Serial No. 704,894.

*To all whom it may concern:*

Be it known that I, FRANK G. WILSON, a citizen of the United States, residing at Crawfordsville, in the county of Crittenden and State of Arkansas, have invented certain new and useful Improvements in Nail-Extractors, of which the following is a specification.

My invention relates to new and useful improvements in combination implements and more particularly to a combined implement for drawing tacks and nails so constructed that it may also be employed for raising stove covers or lifting kettles.

A further object of my invention is to provide an implement of the character described having a finger extending longitudinally from the body of the implement with its free end bent outwardly and rearwardly and bifurcated to form a claw, the intermediate portion of said finger being provided with a triangular shaped recess having inwardly converging side faces forming a second claw adapted to co-act with the first for the extraction of extremely long tacks or nails which could not be readily drawn by the first claw alone.

A further object is to provide a second finger spaced from the finger above described and arranged for lifting the lids of stoves, said second finger extending beyond the first in such a manner as to form a second fulcrum for the implement when employed for pulling nails, this second fulcrum giving greater leverage and permitting the withdrawal of the nail without unduly bending the same.

With these and other objects in view, my invention will be more fully described, illustrated in the drawing, and then specifically pointed out in the claims which are attached to and form a part of this application.

In the drawing: Figure 1 is a perspective view of the implement; Fig. 2 is a fragmentary top plan view, showing the head of the implement and the fingers formed thereon; Fig. 3 is a central longitudinal sectional view, showing the construction of the implement body and also its use as a nail puller, the dotted line, showing the use of the auxiliary fulcrum when extracting comparatively long nails; Fig. 4 is a fragmentary elevation, partially in section, showing the manner of employing the auxiliary claw when extracting long nails, the nail being first partially drawn by the implement as shown in Fig. 3.

Corresponding and like parts are referred to in the following description and indicated in all the views of the drawing by the same reference characters.

My improved implement includes a handle 10 which, as shown, is substantially rectangular in shape and slightly bowed longitudinally, terminating in a head 13 from which project the spaced arms, designated, as a whole by the numerals 14 and 15. This head is formed at one side with a shoulder 24 and at its other side with the finger 14 which, as shown, is equal in width to the width of the body of the implement and the free end portion of which is curved outwardly and rearwardly to form a hook 25 adapted for engagement with the bail of a kettle, whereby the implement may be employed as a kettle lifter. The free terminal of this hook is beveled to form a sharp edge portion 26 and is notched centrally as at 27 to provide a tack or nail engaging claw, the side faces of the notch being inclined with respect to each other in the customary manner to form a seat for the head of the tack or nail.

The finger 14 is provided intermediate its length with a triangular shaped slot 28 which extends longitudinally of the finger and the base of which is directed toward the free end of the finger, while the vertex is directed toward the head of the implement. The side faces of this slot converge inwardly as best shown in Fig. 2 to form a supplemental claw 29, the purpose of which will be hereinafter fully explained. As best shown in Fig. 3, the entire finger 14 is slightly curved from the body portion and in a reverse direction to the curve of the body portion in such a manner that when the body portion is positioned horizontally, the claw 27 will rest flatly upon a horizontal body to engage beneath the head of a tack or nail. The head 13 is also provided between the shoulder 24 and arm 14 with the arm 15 which is greatly reduced in width as shown and slightly bowed longitudinally, this arm extending in spaced position above the central portion of the arm 14 and being so proportioned that its free terminal may be employed as an engaging finger for raising stove covers, as shown in Fig. 5, the numeral 30 there indicating a stove cover of the usual type having a socket 31 forming a shoulder 32 beneath which the finger 15 is engaged when the cover is to be raised.

From the foregoing description, taken in connection with the drawing, the main features of operation will be readily understood, and but slight description of the same is therefore necessary.

The hook 25 provides an efficient form of kettle lifter and may also be employed in removing covers from kettles and the like. The implement however, is of value chiefly because of its extreme adaptability for use in extracting extremely long tacks or nails which an ordinary tack puller cannot pull, due to its relatively short fulcrum. In extracting relatively long nails, the claw 27 is engaged beneath the head of the nail, as best shown in full lines in Fig. 3 and the nail is partially withdrawn by swinging the implement about the curved outer face of the jaw 25 as a fulcrum until the free end of the finger 15 engages the surface of the body from which the nail is being withdrawn. This finger 15 then becomes the fulcrum of the implement giving a relatively long leverage and permitting the withdrawal of the nail to a considerable extent as shown by the dotted lines in Fig. 3. The implement is then disengaged from the head of the nail and is again applied to the nail by passing it downwardly in such a manner as to position the head of the nail in the auxiliary claw 29 when the operation shown in Fig. 3 is repeated, the implement being first swung upon the jaw 25 as a fulcrum and then further swung upon the free end of the finger 15. By this means nails of almost any length may be readily and quickly extracted.

In order to prevent the disengagement of the nail head from the claw 29, the inner face of the finger 14 adjacent the active terminal of the slot 28 is preferably grooved transversely as shown at 33 to provide a seat for the head of the nail. During the last movement in the withdrawing of the nail, the body of the nail seats partially between the sides of the claw 27, thus preventing any lateral swinging of the implement which might otherwise be caused by the relative narrowness of the free end of the finger 15 which is then employed as the fulcrum. From the foregoing description, it will be apparent that I have provided a compound tool which is extremely simple in construction and which is capable of being employed for a number of purposes. Because of the finger 14 having the double claws, and because of the relative proportioning and positioning of the fingers 14 and 15, the implement is particularly adapted for extracting extremely long tacks and nails and for this purpose is far superior to the majority of tack pullers now on the market.

Having thus described the invention, what is claimed as new is:

1. A nail extractor including a body terminating in a head having a projecting finger, the free end of which is curved outwardly and rearwardly to form a claw, the body of said finger being provided with a triangular slot forming a supplemental claw oppositely disposed to the first.

2. A nail extractor including a body terminating in a head having spaced fingers, one of which is longitudinally bowed to serve as a fulcrum during the use of the other and the other of which is shorter than the first and has its free terminal bent outwardly and rearwardly to form a claw and its intermediate portion slotted to form a supplemental claw, the back face of said claw forming finger being grooved transversely adjacent the active end of the supplemental claw forming slot to form a nail receiving seat.

In testimony whereof I affix my signature in presence of two witnesses.

FRANK G. WILSON. [L. S.]

Witnesses:
  E. H. TILEY,
  J. THURMAN HADEN.

---

Copies of this patent may be obtained for five cents each, by addressing the "Commissioner of Patents, Washington, D. C."